LEOPOLD M.L.J. LEBLANS
INVENTOR.

AGENT

United States Patent Office 2,754,712
Patented July 17, 1956

2,754,712

ROTARY SPINDLE

Leopold Michael Lambert Joseph Leblans, Eindhoven, Netherlands, assignor to Hartford National Bank and Trust Company, Hartford, Conn., as trustee Application March 23, 1951, Serial No. 217,156

Claims priority, application Netherlands March 25, 1950

4 Claims. (Cl. 82—30)

This invention relates generally to chipping machines and more particularly to those machines which are used for operations necessitating optical precision. Such machinery may be lathes, grinding machines, milling machines and the like.

The term "optical precision" is to be understood to mean a precision such as is customary in the optical industry in the manufacture of lenses and mirrors. In such manufacture, in most cases thereof, the minimum criterion must be applied that a particular surface which is required for a specific optical action, does not differ from the dimensions mathematically prescribed, to an extent greater than some microns. It would, in certain cases, be desirable to ensure such precision also in the treatment of other work-pieces on chipping machines, since such precision may be highly advantageous in the manufacture of certain other determined instruments or devices.

One of the primary objects of the present invention is to provide a construction for supporting, in the longitudinal direction, the main spindle of a chipping machine by the use of comparatively simple means but without sacrificing the aforesaid precision in operating a work-piece on such machine.

The chipping machine for operations necessitating optical precision in accordance with the present invention, is characterised in that the main spindle of the machine in the longitudinal direction is subject to different pressures of media, i. e. the atmospheric pressure and a subatmospheric pressure. The spindle is then urged against a collar thrust bearing as a result of the difference between the aforesaid pressures.

Applicant has found that by utilising the invention, it is possible to provide a support in the longitudinal direction of the main spindle of a chipping machine, which substantially does not have any clearance in the longitudinal direction of the said spindle. Work-pieces may then be worked with the precision indicated above on a machine comprising a main spindle supported in this manner.

The invention affords the advantage that it is not necessary to utilise gas pressure of a value higher than the atmospheric pressure, with the risk of leakage. This method of maintaining the pressure difference has the further advantage that the main spindle of the machine may be made very simple in structure. That is, the machine may be so constructed that, at one of its ends, it has the shape of a smooth cylindrical body having a terminal surface thereof located in a space in which a pressure lower than the atmospheric pressure prevails. In such manner, the said surface is urged therein against a collar thrust bearing.

The pressure difference maintained on the main spindle may be used not only for keeping the main spindle urged against a collar thrust bearing, but also for causing a liquid to flow along the surface of the main spindle. This liquid may be intended solely to cool the support for the main spindle in the transverse direction and/or, preferably, to lubricate said support. In a further embodiment of the invention, the main spindle may be enclosed in a bearing bushing, one end of which is connected to the space in which a subpressure is maintained. A liquid supply conduit may then be provided which opens out of the running surface of the bearing bushing in the vicinity of the end thereof remote from the said space, while the space in which subpressure prevails is provided with a liquid discharge conduit. As a result of the difference in pressure prevailing on the main spindle, a continuous flow of liquid is thus ensured between the surfaces of the main spindle and the bearing bushing co-operating with one another.

For proper serviceability of the machine, according to the invention, it is desirable that the collar thrust bearing should be made adjustable in the longitudinal direction of the main spindle.

In order that the invention may be more clearly understood and readily carried into effect, it will now be described more fully by reference to the accompanying drawing wherein.

Figure 1:
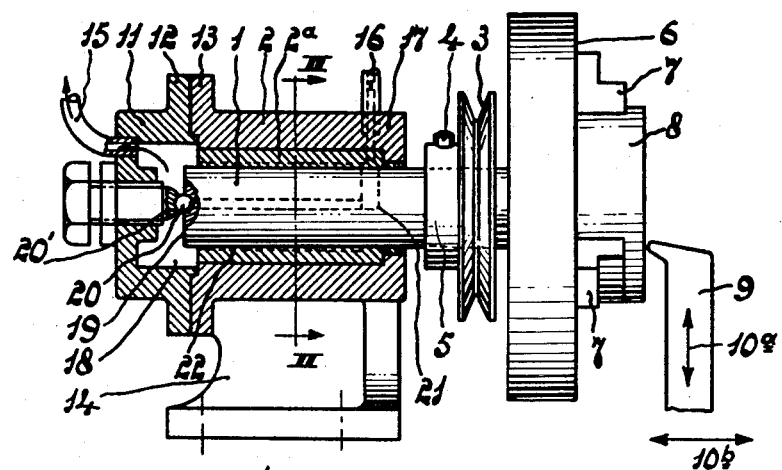
Fig. 1 is a diagrammatic representation, partly in longitudinal section, of one form of construction of a machine according to the invention.
Figure 2:
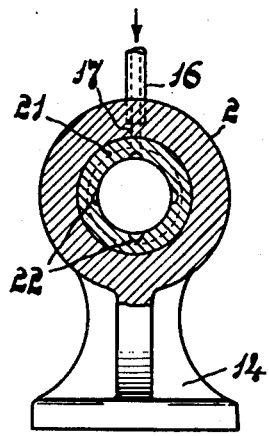
Fig. 2 is a cross-section of the device illustrated in Fig. 1; the section being taken on the line II—II thereon.

The machine shown in Fig. 1 comprises a main spindle 1 supported in the transverse direction by a bearing 2a enclosed in a housing 2. The co-operating surfaces of the main spindle 1 and of the bearing 2a are so constructed and arranged that the clearance of spindle 1 in the transverse direction thereof is reduced to a minimum. Secured to spindle 1 is a pulley wheel 3. The means for securing the pulley wheel 3 comprise an adjusting screw 4 mounted in a sleeve 5 integral with the pulley wheel 3. The right-hand extremity of spindle 1, as viewed in Fig. 1, carries a head 6, in which a work-piece 8 is secured with the use of claws 7 in a conventional manner. In the embodiment shown, the head surface of the work-piece 8 is to be worked by a tool 9 (which, for the sake of clearness, is shown as being located in the plane of the drawing instead of at right angles thereto). The tool is adapted to reciprocate on a support (not shown) in the direction of the arrows 10a and 10b.

The housing 2 is shut off at its left-hand end, as viewed in Fig. 1, by means of a cover 11 secured to the housing 2 with the use of bolts (not shown) mounted in flanges 12 and 13. Furthermore, the housing 2 comprises a base 14 which permits mounting the mechanism shown, on a table.

The left-hand end of the main spindle 1 is located in a space 18 recessed in the cover 11. Provided between the inner surface of the cover 11 and the left-hand end surface 19 of the spindle 1 is a collar thrust bearing 20, which is indicated here diagrammatically by a ball mounted in a recess 20' in the said inner surface of the cover 11.

The main spindle 1 supported in the bearing 2a is completely smooth. The space 18 communicates through a conduit 15 with a space in which a pressure lower than atmospheric is maintained.

When the machine shown is in operation and the main spindle 1 is thus driven with the use of a rope (not shown) provided over the pulley wheel 3 and, furthermore, a pressure lower than atmosphere is maintained in the space 18 through a conduit 15, it is found that, due to such lower pressure, the main spindle 1 is drawn, as it were, against the collar thrust bearing 20 so that the desired extremely accurate position of the main spindle 1 in the axial direction is ensured. If desired, this drawing action upon the main spindle 1 may be utilised to cause a flow of liquid to move along the surface of the main spindle 1 and hence along the inner surface of the bearing 2a for the spindle 1. For this purpose, as shown in dotted lines in Fig. 1, liquid may be supplied by means of a conduit 16 through a transverse bore 17 in the housing 2 to an annular groove 21, which in this form of construction communicates with the space 18 through four channels 22 of segment-like section (Fig. 3). Due to the reduced pressure prevailing in the space 18, this liquid is sucked through conduit 16, bore 17, the annular groove 21 and the channels 22 to the space 18 and subsequently carried away through conduit 15. Both air and liquid will thus flow through conduit 15.

This liquid may serve solely to cool the support for the main spindle 1 in the bearing 2a and, as will generally be desirable, at the same time to lubricate this support. In the latter case a kind of oil suitable for the purpose will be pumped through the channel system described.

What I claim is:

1. A chipping machine for performing operations with optical precision comprising a main spindle having one end thereof in the shape of a smooth cylindrical body, means forming a chamber in which said main spindle end is located, means for mounting a work-piece on said spindle remote from said end thereof for rotation therewith, a thrust bearing mounted in said chamber against which said main spindle end is adapted to bear in the longitudinal direction thereof, and means for applying a subatmospheric pressure to said chamber so that atmospheric pressure is exerted in the direction to urge said main spindle against said thrust bearing, means for introducing a liquid to said surface of said spindle remote from said one region thereof and adjacent said other region whereby a continual flow thereof toward said one region is induced by the difference between said atmospheric and subatmospheric pressures, and a conduit communicating with said chamber for carrying away both liquid and air therefrom.

2. A chipping machine for performing operations with optical precision comprising a main spindle having a substantially elongate bearing surface, means for mounting a work-piece thereon for rotation therewith, a thrust bearing against which said main spindle is adapted to bear in the longitudinal direction thereof, means for applying a subatmospheric pressure of media to said main spindle at one region thereof, means for applying atmospheric pressure to said main spindle at another region thereof with atmospheric pressure being exerted in the direction to urge said main spindle against said thrust bearing, and means for introducing a liquid to said surface of said spindle remote from said one region thereof and adjacent said another region whereby a continual flow thereof toward said one region is induced by the difference between said atmospheric and subatmospheric pressures.

3. A chipping machine for performing operations with optical precision comprising a main spindle having a substantially elongate bearing surface, a bearing bushing in which said main spindle surface is rotatably mounted, means forming a chamber in which one end of said main spindle is located, means for mounting a work-piece on said spindle for rotation therewith, a thrust bearing mounted in said chamber against which said main spindle is adapted to bear in the longitudinal direction thereof, means for applying a subatmospheric pressure of media to said chamber, means for applying atmospheric pressure of media to said main spindle at another region thereof remote from said end with the atmospheric pressure being exerted in the direction to urge said main spindle against said thrust bearing, and means for introducing a liquid to said surface of said spindle remote from said one region thereof and adjacent said another region whereby flow thereof toward said one region is induced by the difference between said atmospheric and subatmospheric pressures, said last-mentioned means comprising longitudinal channels in said bearing bushing which open out into said chamber, and said liquid serving to lubricate said spindle and said bearing bushing upon flow from said other region to said one region.

4. A chipping machine for performing operations with optical precision and comprising a main spindle having one end thereof in the shape of a smooth cylindrical body, a bearing bushing in which said main spindle is rotatably mounted, means forming a chamber in which said main spindle end is located, a conduit in said chamber, means mounting a work-piece on said spindle remote from said end thereof for rotation therewith, a thrust bearing mounted in said chamber against which said main spindle end is adapted to bear in the longitudinal direction thereof, means for applying a subatmospheric pressure to said chamber so that atmospheric pressure is exerted in a direction to urge said main spindle against said thrust bearing, and means for supplying a liquid to the surface of said spindle which is adapted to lubricate said spindle and said bearing bushing upon flow of said liquid, and said liquid being subsequently carried away through said conduit.

References Cited in the file of this patent

UNITED STATES PATENTS

| 560,001 | Hurley | May 12, 1896 |
| 611,984 | Wright | Oct. 4, 1898 |
| 1,130,679 | Staunton | Mar. 2, 1915 |
| 2,086,896 | Carter | July 13, 1937 |
| 2,610,096 | Mallory | Sept. 9, 1952 |